(12) United States Patent
Nava

(10) Patent No.: US 7,140,870 B2
(45) Date of Patent: Nov. 28, 2006

(54) VARIABLE-PITCH ARM STAR CONSTRUCTION FOR ROTARY MOLDING MACHINES FOR MAKING, BY DRAWING AND BLOWING, PLASTIC VESSELS AND BOTTLES, AND ROTARY MOLDING MACHINE COMPRISING THE STAR CONSTRUCTION

(76) Inventor: Paolo Nava, Via Piazzalunga, 30 24015 San Giovanni Bianco, Bergamo (IT)

( * ) Notice: Subject to any disclaimer, the term of this patent is extended or adjusted under 35 U.S.C. 154(b) by 360 days.

(21) Appl. No.: 10/761,608

(22) Filed: Jan. 21, 2004

(65) Prior Publication Data

US 2004/0151798 A1 Aug. 5, 2004

(30) Foreign Application Priority Data

Feb. 5, 2003 (IT) ............................ MI2003A0194

(51) Int. Cl.
*B29C 49/42* (2006.01)
*B29C 31/08* (2006.01)

(52) U.S. Cl. ................ 425/534; 198/470.1; 198/803.9; 425/540

(58) Field of Classification Search ................ 425/534, 425/540; 198/803.9, 470.1
See application file for complete search history.

(56) References Cited

U.S. PATENT DOCUMENTS

| 5,683,729 | A | * | 11/1997 | Valles | 425/526 |
| 5,863,571 | A | * | 1/1999 | Santais et al. | 425/526 |
| 6,386,857 | B1 | * | 5/2002 | Nava | 425/526 |
| 6,649,118 | B1 | * | 11/2003 | Dunlap et al. | 264/509 |
| 6,779,651 | B1 | * | 8/2004 | Linglet et al. | 198/803.9 |

FOREIGN PATENT DOCUMENTS

DE 10017050 A1 * 10/2001
WO WO 01/44084 A2 * 6/2001

* cited by examiner

*Primary Examiner*—Robert B. Davis
(74) *Attorney, Agent, or Firm*—Hedman & Costigan; James V. Costigan

(57) ABSTRACT

A star construction having variable pitch arms for a rotary molding machine for making plastic vessels and bottles, comprises a plurality of arms including gripper elements and a system including two levers which engages with the grippers, while cooperating with respective cam contours, the lever and cam system being reciprocatedly driven for providing a pitch variation and controlling the positions of the gripper elements.

With respect to prior solutions, the variable pitch arm star construction according to the invention allows to quickly and simply perform the operations necessary for modifying the arm pitch.

4 Claims, 5 Drawing Sheets

VARIABLE-PITCH ARM STAR CONSTRUCTION FOR ROTARY MOLDING MACHINES FOR MAKING, BY DRAWING AND BLOWING, PLASTIC VESSELS AND BOTTLES, AND ROTARY MOLDING MACHINE COMPRISING THE STAR CONSTRUCTION

BACKGROUND OF THE INVENTION

The present invention relates to a variable-pitch arm star construction for rotary molding machines for making, by drawing and blowing, plastic vessels and bottles, and a rotary molding machine comprising the star construction.

More specifically, the field of the invention is that of the machines which are used for making plastic material bottles and vessels, particularly of PET, by a drawing-blowing molding process, carried out starting from a molded preform.

For making the above mentioned bottles or vessels, a starting preform or parison, consisting of a tubular PET body having a closed bottom, is heated to a desired molding temperature, drawn, pre-blown and blown to a final forming pressure, for forming the bottle inside the mold.

In the above mentioned types of molding machines, the molds are rotatably supported on a supporting star or wheel construction, upstream and downstream of which are provided star arrangements, respectively for supplying the parisons and removing the blown bottles.

In particular, the star construction designed for feeding the parisons to the mold must be adapted to receive the parisons from a rotary feeder having a small operating pitch, and to transfer the received parison toward the mold supporting wheel, which has a larger pitch.

Variable pitch arm star construction are also known: however, they are greatly complex, and their variable pitch can be replaced or re-timed only by performing very difficult operations.

SUMMARY OF THE INVENTION

Accordingly, the main object of the present invention is to overcome the above mentioned drawbacks of the prior art, by providing a variable pitch arm star construction which allows to quickly and simply replace the cams thereof, depending on the preselected operating pitch.

The above and yet other objects, which will become more apparent hereinafter, are achieved by the star construction according to claim 1.

Preferred embodiments of the invention are disclosed in the remaining claims.

With respect to a conventional prior star construction, the variable pitch arm star assembly according to the present invention allows to perform, in a very quick and simple manner, all of the operations which are necessary for modifying the pitch of the star arms.

BRIEF DESCRIPTION OF THE DRAWINGS

The above mentioned, as well as yet other characteristics and advantages of the invention, will become more apparent from the accompanying drawings, in which is shown, by way of an example and not of limitation, a preferred embodiment of the inventive variable pitch arm star construction.

In the drawings.

DESCRIPTION OF THE PREFERRED EMBODIMENT

Figure 2:
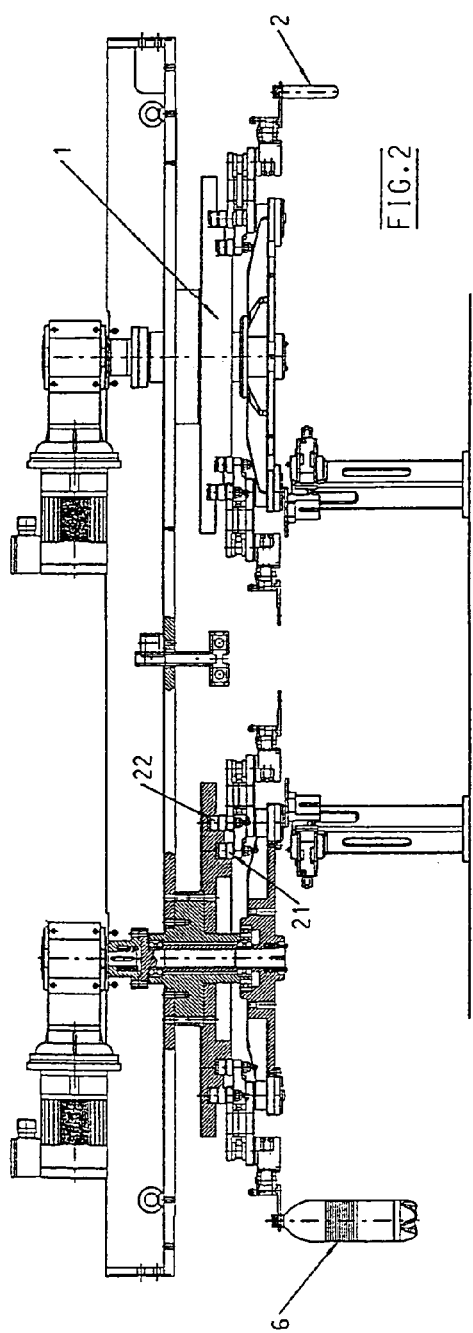
FIG. 2 illustrates the operating assembly shown in FIG. 1, the star construction being respectively shown in a side view and in a cross-sectional view.
Figure 1:
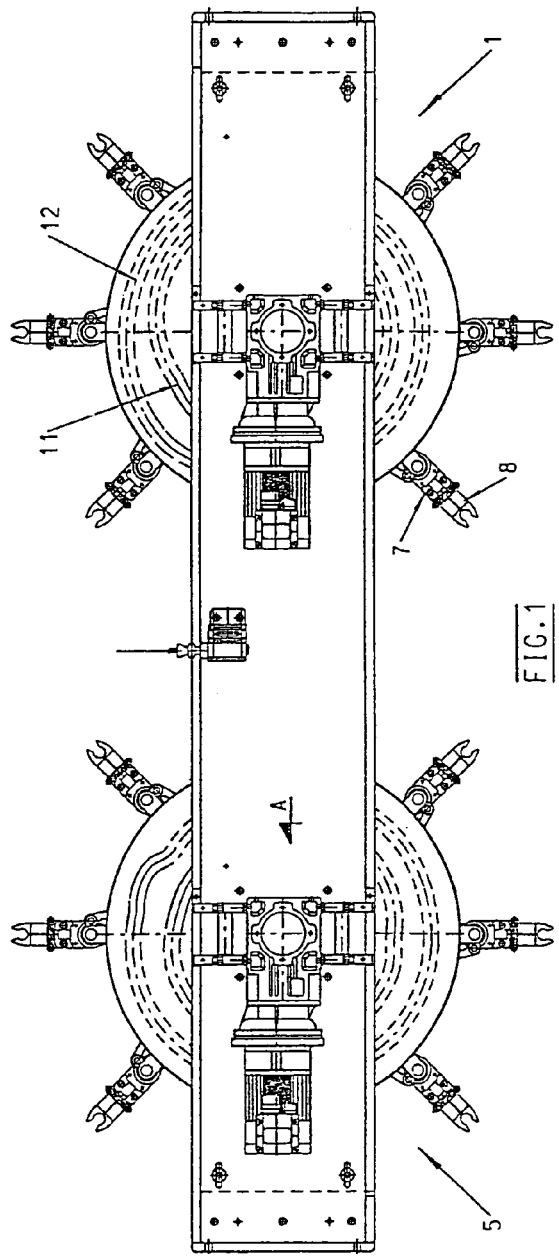
FIG. 1 is a top plan view illustrating an operating assembly for feeding the parisons and removing the blown bottles, said operating assembly including two variable pitch star constructions according to the invention.

The operating assembly shown in FIGS. 1 and 2 comprises a supplying star construction 1 for feeding or supplying the parisons 2 to the mold 3, supported by a respective star construction 4, and a further star construction 5 for taking or removing the bottles 6 from the mold 3.

Said star constructions 1 and 5 are in turn provided with a plurality of variable pitch arms 7, each having gripper elements 8.

Figure 6:
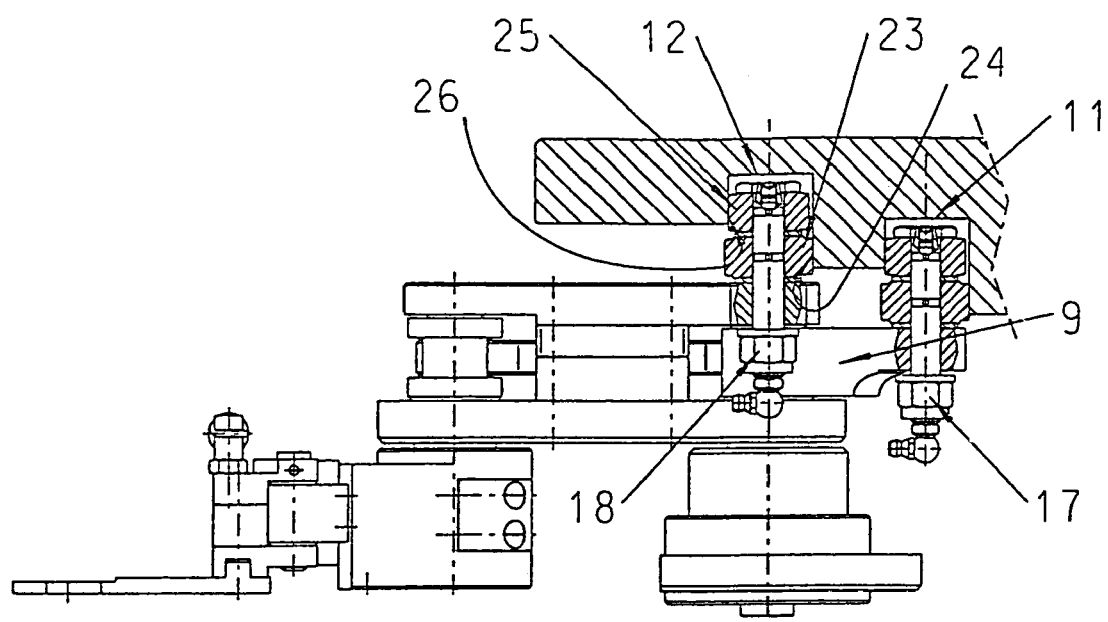
FIGS. 4 to 6 illustrate the gripper assembly of FIG. 3, respectively by a cross-sectional view B—B, a cross-sectional view A—A and a front view.
Figure 3:
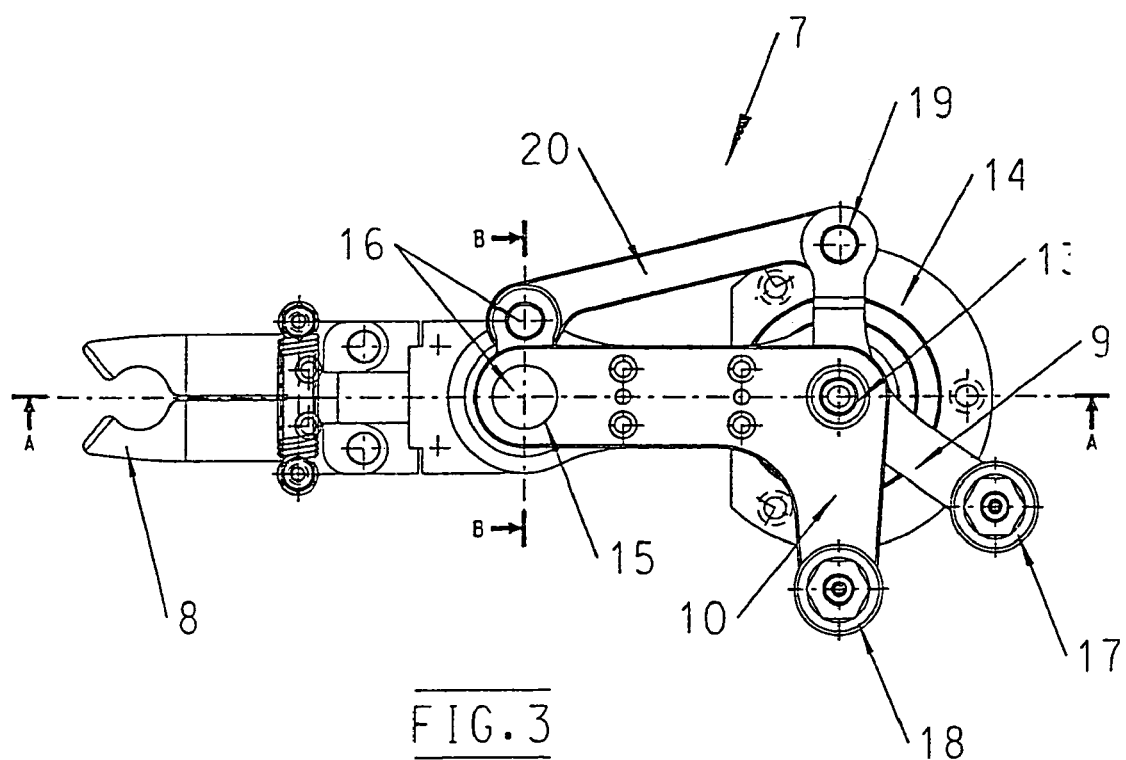
FIG. 3 illustrates, by a top plan view, the gripper assembly of the star construction of the preceding figures.
Figure 5:
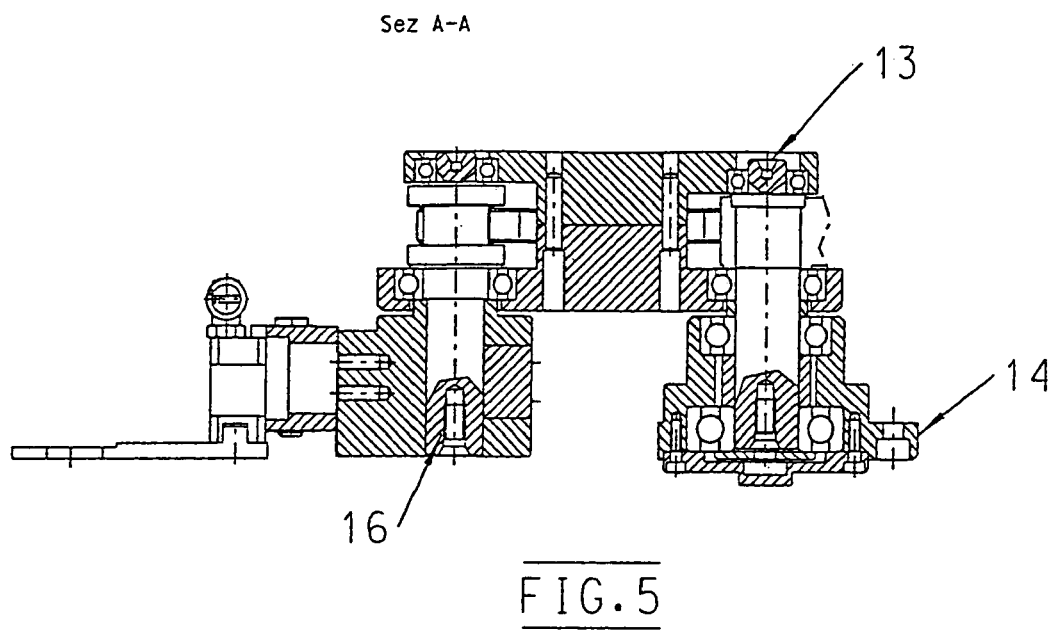
Figure 7:
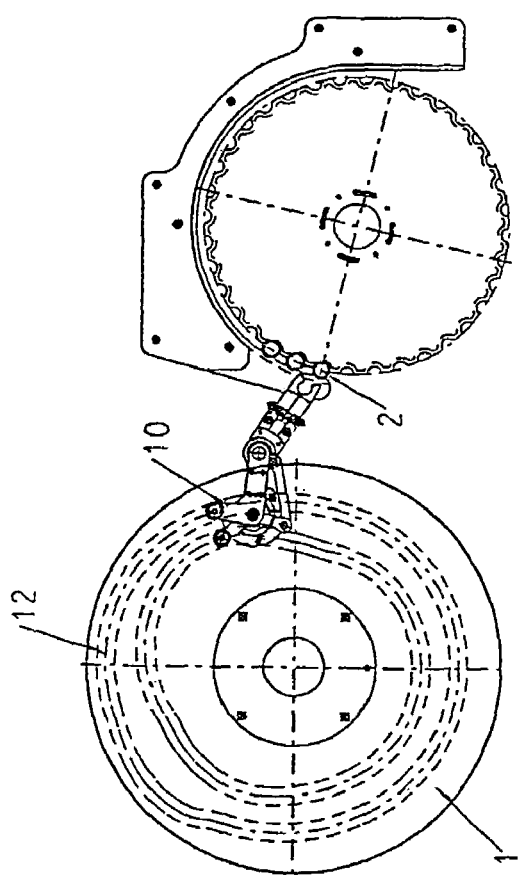
FIGS. 7 to 10 respectively illustrates the operating steps for starting the parison taking operation, removing the parisons from their supply, introducing said parisons into the mold, and releasing said parison in said mold.
Figure 8:
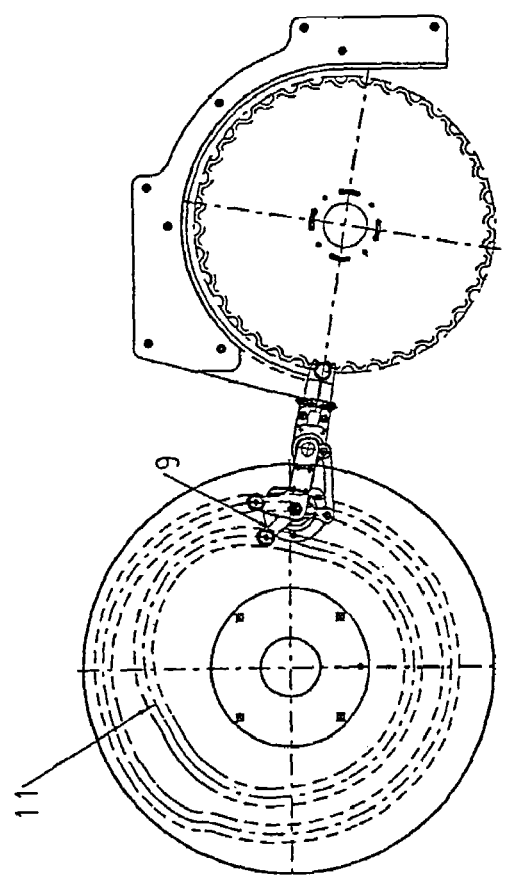
Figure 9:
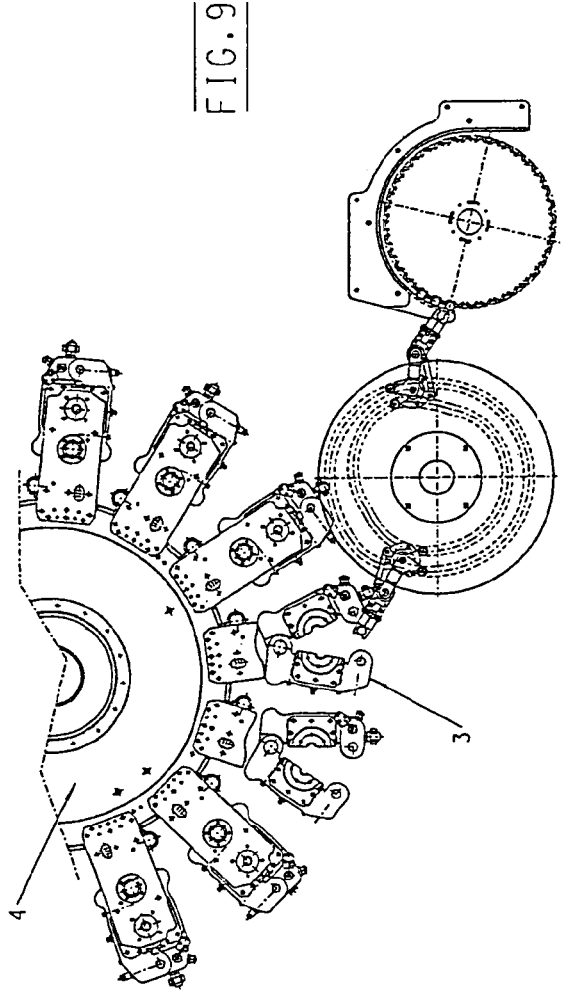
Figure 10:
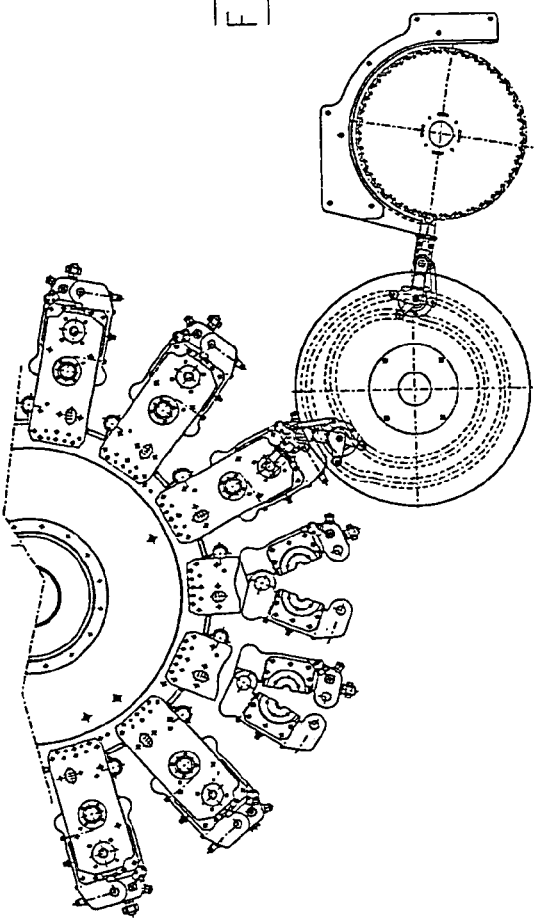

More specifically, the variable pitch arm 7 shown in FIGS. 3 to 6, comprises two levers, respectively indicated by 9 and 10, designed for cooperating with respective contours of cams 11 and 12 at their end portions 17 and 18 (see FIGS. 2, 7, 8).

Said levers 9 and 10 are in turn mutually pivoted at a pivot pin 13 supported by a supporting flange 14.

The lever 10 has a substantially L-shape construction, with an end portion 15 articulated on the gripper 8 at a double pin element 16.

The lever 9, which also has a substantially L-shape, has an end portion 19 thereof pivoted on a connecting rod 20, in turn articulated on the double pin element 16.

Figure 4:
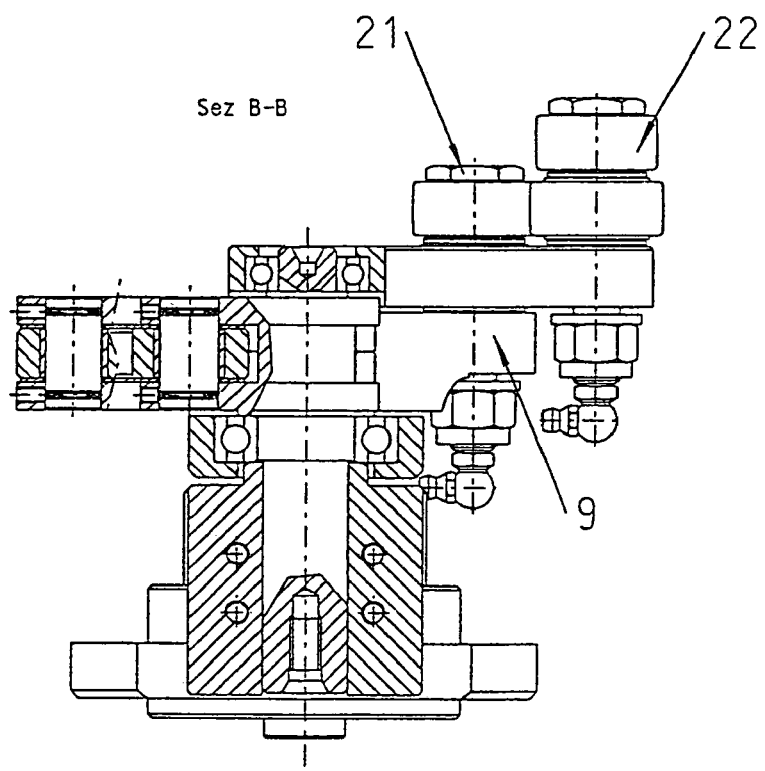

As is clearly shown in FIGS. 4 and 6, the end portions 17 and 18 of the levers 9 and 10 are provided with a different diameter double-bearing, respectively indicated by the reference numbers 21 and 22.

Said bearings are designed for engaging in a corresponding engaging slot, defining the above mentioned cam contours 11 and 12.

As shown in FIG. 6, the larger diameter bottom portion 23 of the double bearing 22 (or 21) interferes against the inner edge 24 of the cam contour, whereas the smaller diameter top portion 25 of that same bearing bears on the outer edge 26 of said cam contour.

Thus, it is assured a proper rolling ratio between the end portions of the levers and the respective cam contours, thereby advantageously eliminating any clearances.

The mode of operation of the variable pitch arm star construction according to the invention is shown in FIGS. 7 to 10, in which have been shown the different operating positions assumed by an arm and related gripper, respectively as the arm is moved toward the parison, as it removes the latter, and is moved toward the respective mold to release the parison in said mold.

Owing to the very simple construction of the variable pitch arms 7, the latter can be easily and simply removed from their supporting star construction, for their replacement or for adjusting them, by merely removing the respective supporting flange 14 from the star construction body (for example by removing screws or other fixing elements).

While the invention has been disclosed and illustrated with reference to a preferred embodiment thereof, it should be apparent that the disclosed embodiment is susceptible to several modifications and variations, all of which will come within the scope of the invention.

The invention claimed is:

1. A variable pitch arm star construction for rotary molding machine for making plastic vessels or bottles by a drawing-blowing operation, said star construction comprising arms arranged with a variable arm pitch and having gripper elements and a cooperating lever and cam system for changing said variable pitch arm and properly orienting said grippers, said system comprising two levers which, on a side, engaged with said gripper and, on the other side, cooperate with respective cam contours, wherein said levers have respective end portions wherein said respective end portions each include a different diameter double bearing.

2. A star construction according to claim 1, said levers being pivoted on a pivot pin supported by a respective supporting flange rigid with said star construction, said levers having a substantially L-shape, one end portion of each of said levers being pivoted on said gripper on a pivot pin and having an opposite end portion of said lever pivoted on a connecting rod which is in turn articulated on said pivot pin, wherein said pivot pin is a double pivot pin.

3. A star construction according to claim 1, wherein said double bearing has a bottom portion interfering against an inner edge of said cam contour, and a top portion bearing on an outer edge of said cam contour.

4. A star construction according to claim 1, wherein said bottom portion of said double bearing has a diameter larger than that of said top portion of said double bearing.

* * * * *